July 14, 1970 J. E. YOUNG 3,520,405

RANDOM INFORMATION RETRIEVAL SYSTEM

Filed July 19, 1967 4 Sheets-Sheet 1

INVENTOR.
JAMES E. YOUNG

BY Ronald Zibelli

ATTORNEYS

INVENTOR.
JAMES E. YOUNG
BY Ronald Zibelli
ATTORNEYS

July 14, 1970 J. E. YOUNG 3,520,405

RANDOM INFORMATION RETRIEVAL SYSTEM

Filed July 19, 1967 4 Sheets-Sheet 3

INVENTOR.
JAMES E. YOUNG
BY Ronald Zibelli
ATTORNEYS

July 14, 1970 J. E. YOUNG 3,520,405

RANDOM INFORMATION RETRIEVAL SYSTEM

Filed July 19, 1967 4 Sheets-Sheet 4

INVENTOR.
JAMES E. YOUNG

BY Ronald Zibelli

ATTORNEYS

United States Patent Office 3,520,405

Patented July 14, 1970

3,520,405

RANDOM INFORMATION RETRIEVAL SYSTEM

James E. Young, Pittsford, N.Y., assignor to Xerox Corporation, Rochester, N.Y., a corporation of New York Filed July 19, 1967, Ser. No. 654,408
Int. Cl. B07c 5/344
U.S. Cl. 209—80.5 3 Claims

ABSTRACT OF THE DISCLOSURE

A random retrieval system utilizing selectively actuatable magnetic members to attract magnetic portions of information bearing members which are not desired for retrieval, the desired information bearing member being so coded as to be unaffected by the attractive force of the actuated magnetic members.

BACKGROUND OF THE INVENTION

This invention relates generally to random access information retrieval systems, and specifically, to retrieval systems employing information bearing members having edges which may be coded.

The applications of random access retrieval systems have been enhanced and increased with the wider use of aperture cards and microfiche as information storage media. In addition, commercial apparatus are available now to record images of documents on EAM cards at 2× or greater reductions.

With the wider use of such improved information storage media, attention has been directed to the apparatus for retrieval of these information media. Certain ideal aspects of a preferable retrieval device can be enumerated.

Accuracy of retrieval is always a desired, if not required, feature.

With larger stores of information, compactness of these stores in a retrievable configuration is a premium which enhances the economical attractiveness of any apparatus. Such compactness must not interfere with the retrieval operation itself. Generally, information stores of this nature are configured in tiers of card magazines, for example, so that any space savings intermediate adjacent magazines is greatly sought after.

Other design features which have been pursued by designers of retrieval apparatus is the minimization of moving parts and the ultimate in simplicity in mechanical operation. Prior art systems have utilized moving sensors which patrol each magazine in search of the desired card. Others utilize the movement of rods which physically seek out a particular combination of notches in a card's edge. These systems are mechanically complicated and noisy. The noise disadvantage is particularly significant for small stores of information desired to be located in an office or other area where extraneous noise is undesirable, such as a library. In addition, some prior art retrieval methods necessitate excessive contact with the stored cards so as to wear or mutilate the cards making them no longer acceptable for information storage and/or retrieval.

SUMMARY OF THE INVENTION

Therefore, it is an object of the present invention to improve random access information retrieval systems.

It is another object of the present invention to provide an improved random access retrieval system having mechanical simplicity and maximum compactness capability.

A further object of the present invention is to improve retrieval systems wherein the retrieved members are subjected to a minimum of amount of wear or mutilation.

Additionally, an object of the present invention is to provide an improved retrieval system which permits a high degree of retrieval accuracy and facilitates easy retrieval of a desired information member.

These and other objects which may become apparent are accomplished in accordance with the principles of the present invention wherein information bearing members to be retrieved are coded magnetically along at least one edge thereof. These magnetic codes interact with energized magnetic means, either electro- or permanent magnetics, located over every code area of members held in a magazine. These magnetic means are energized in accordance with the code of the member to be retrieved. After this, the members not so selected will be retained magnetically against the magnetic means while the desired information bearing member will be attracted by gravity to disassociate itself with the undesired cards.

DESCRIPTION OF THE PREFERRED EMBODIMENT

Figure 1:
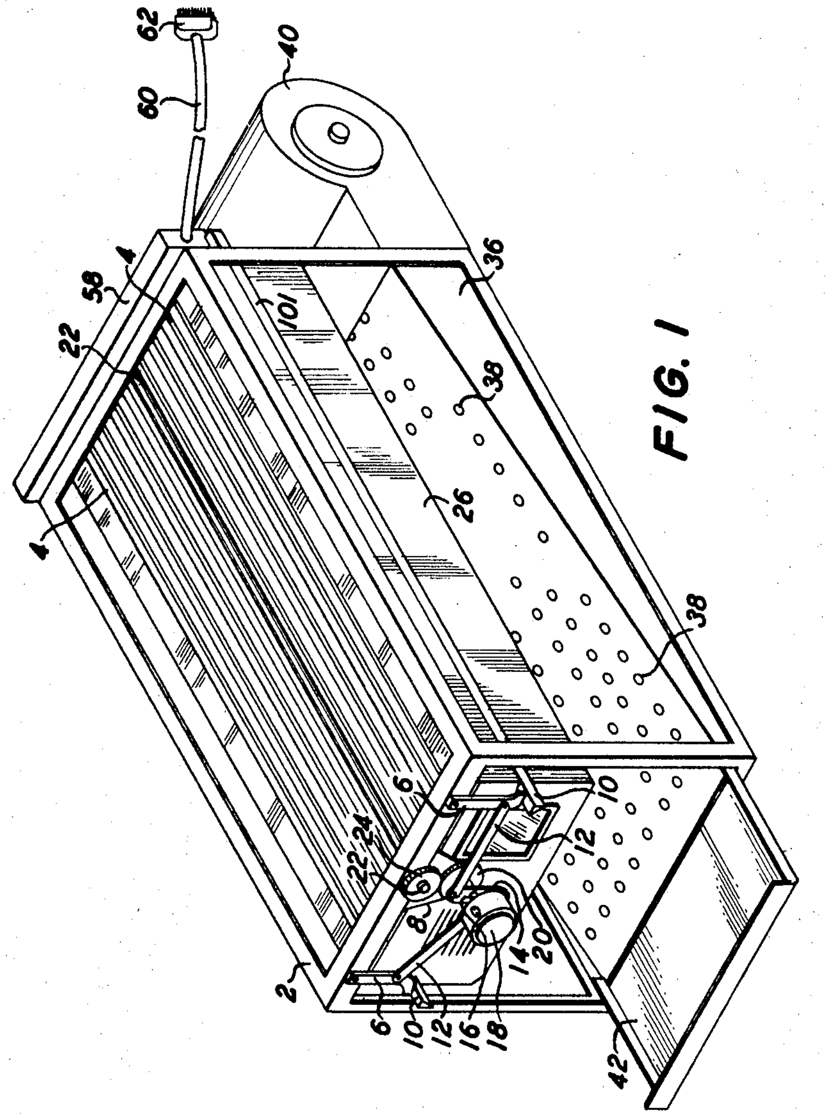
FIG. 1 is a perspective view of a retrieval module in accordance with the present invention.
Figure 2:
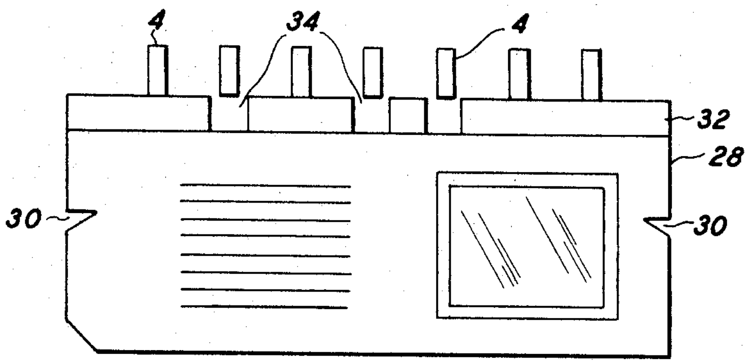
FIG. 2 illustrates relationship between an information bearing member and a plurality of magnetic elements.

Reference will now be made to FIGS. 1 and 2. FIG. 1 illustrates a single retrieval module comprising a frame 2 which defines a rectangular volume. Along one side of the volume there is supported a plurality of magnetic members 4 which are selectively actuatable for generating a magnetic attractive field.

The nature of these magnetic members will be described in more detail hereinafter in connection with FIGS. 3, 4, and 5. It is sufficient to state at this time that a magnetic attractive field is generated by these magnetic members 4 so as to support or attract in contact therewith suitable magnetic material which is affixed to an information bearing member, for example.

These magnetic members extend linearly between two sides of the aforementioned volume defined by frame member 2. At one of these sides there is located a mechanical assembly which is secured to the frame member 4 by way of flanges 6 and support piece 8. Secured to each flange 6 is one of a pair of rectangular cross sectional keeper bars 10. Flange members 6 are pivotally mounted on the frame member 2 so as to permit keeper bars 10 to move away from and toward each other depending upon the force translated to flange members 6 via arms 12. These arms 12 have one end pivotally secured to a respective flange member 6 and the other end pivotally secured to opposite ends of a drive member 14. This drive member is fixed to a shaft 16, the rotation of which is controlled by a rotary solenoid 18 connected to one end thereof. Also secured to this shaft 16 is a drive gear 20. The other end of this shaft is journaled to rotate in the support piece 8. Passing through two sections of frame member 4 is a shaft 22 journaled to rotate in these sections of the frame member. Fixed to opposite ends of this shaft 22 is an idler gear 24. This gear 24 engages with drive gear 20 to be driven thereby upon actuation of the rotary solenoid 18.

Not shown in the perspective illustration of FIG. 1 but located at the other end of the volume defined by frame member 2 on shaft 22 is an identical mechanical assembly as just described with the single omission of the rotary solenoid 18. These two mechanical assemblies operate in synchronism and effectively move the keeper bars 10 away from or toward each other depending upon the state of the rotary solenoid 18. It is noted, that the position of the rotary solenoid at the end of the shaft 16 as shown in FIG. 1 may be reversed so as to be fixed to the opposite end of the shaft 22.

As shown in FIG. 1, the frame member 22 and the keeper bars 10 cooperate to support a plurality of information bearing members 26, which in this case are shown as aperture cards. These cards may better be explained with reference to FIG. 2 which shows a typical card 28 having notches 30 therein oppositely disposed on two edges of the card. The configuration of the notches is appropriate to cooperate with the configuration of the keeper bar which in the illustration of FIG. 1 is triangular in cross section. Along another edge of card 28 there is secured a strip 32 of magnetic material.

This strip may be of any suitable material having appropriate magnetic characteristics and preferably should have a low magnetic retentivity value to prevent any magnetization of the strip after numerous retrieval operations. This will be seen more fully hereinafter.

The card 28 in FIG. 2 has been coded by the technique of placing notches 34 in the magnetic material as illustrated. Immediately above the card 28 there is shown a plurality of magnetic means 4 already referred to in the description of FIG. 1. Each of these magnetic means corresponds to one of seven code areas along the magnetic strip 32. As shown in FIG. 2, moving from left to right as that figure is viewed, code areas 2, 4, and 5 have been coded. In coding these code areas the magnetic material comprising strip 32 is merely removed to effectively reduce the influence of the magnetic member associated with this code area. It should be understood that while FIG. 2 illustrates the removal of the magnetic material completely, the notch 34 used in coding a code area need not completely bisect the magnetic strip 32. Only a sufficient amount of the magnetic strip 32 need be removed to reduce the attractive force of the magnetic member 4 associated with the particular code area to a degree such that the magnetic strip and the card fixed thereto will no longer be supported by the attractive force of that particular magnetic member. Alternatively, magnetic tabs could also be used and located at those code areas not desired to be coded.

The technique used in accordance with the principles of the present invention to retrieve information bearing member such as aperture cards is to energize those magnetic members 4 corresponding to the coded areas of the particular card desired to be retrieved. As shown in FIG. 2 the code may be 245. Therefore those magnetic means associated with the code areas 2, 4, and 5 are energized while the other magnetic means are left in an unenergized state. In this manner, the magnetic members so energized will act to attract all the cards with the exception of that particular card having the code areas 2, 4, and 5 suitably notched.

Referring again to FIG. 1, the card bearing the code 245 upon energization of the appropriate magnetic members 4 and rotary solenoid 18 will disassociate itself from the remaining cards being attracted by the energized magnetic members. To facilitate this disassociation, the retrieval module of FIG. 1 may be provided with an air manifold 36 having apertures 38 in one surface thereof which is connected to a blower unit 40. This blower unit will provide a low velocity stream of air to slightly ruffle the suspended cards thereby reducing friction between adjacent cards permitting the desired card to fall free onto the apertured manifold. The continuing air flow will gently urge the card down the manifold to a receiving tray 42 where the card may then be picked up manually. Alternatively, the entire frame member 2 may be gently vibrated to achieve the same result as the air stream.

Figures 3, 4:
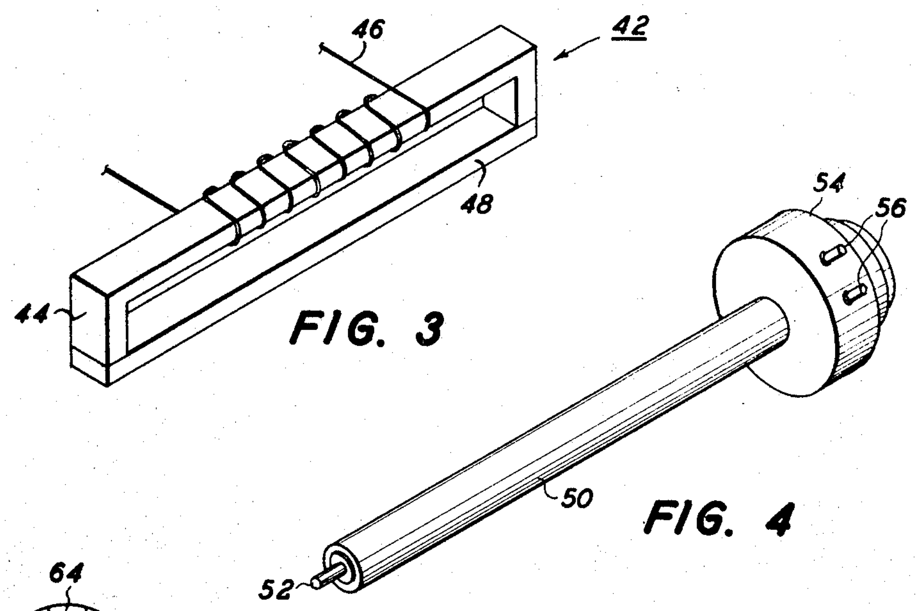
FIG. 3 illustrates an electromagnetic suitable for use in the retrieval module of FIG. 1.
FIG. 4 illustrates an alternative magnetic member for use in the retrieval module of FIG. 1.

Referring now to FIG. 3 there is illustrated an electromagnet 42 which may be used in the retrieval module of FIG. 1. A C-shaped member 44 has an energizing coil 46 wrapped around the segment of the member intermediate the two parallel legs. In contact with the parallel legs and running substantially parallel to the section of the magnetic member supporting the energizing coil is a segment 48 of similar material as that of the C-shaped member. This electromagnet 42 generates an attractive magnetic field when current is provided through the energizing coil 46. The magnetic flux generated upon energization of coil 46 would be in a direction conforming to the magnetic material of the C-shaped member 44 and the bar 48. In addition, stray flux will also be present outside of this material but in a direction parallel to the flux in the magnetic material. In this manner, if the magnetic members 4 in FIG. 2 were actually electromagnets as illustrated in FIG. 3, this flux would be in a direction substantially transverse to the plane of the magnetic strip 32. Of course, when the coil is de-energized, no flux will be present in the electromagnet.

An alternative magnetic member is illustrated in FIG. 4 and comprises a cylindrical permanent magnet 50 having a discrete north and south pole, the axis of which is perpendicular to and passes through the axis of the cylinder. This permanent magnet may be formed of any suitable material, for example, oriented ferrite particles in a plastic or ceramic binder. Fixed to one end of the permanent magnet 50 is a shaft 52 which supports the permanent magnet rotatably relative to the frame member 2 of FIG. 1.

At the opposite end of the permanent magnet 50 on this shaft 52 is a rotary solenoid 54 fixed thereto and having terminals 56 adapted to receive electric current. The solenoid 54 is coupled to the permanent magnet 50 to selectively rotate the axis of its magnetic poles 90 degrees upon energization of the solenoid 54.

Referring once again to FIG. 1, the rotary solenoid 54 associated with each of the magnetic members 4 represented as permanent magnets 50 may be housed in a housing 58 and the output leads of the solenoids brought out via conductor 60 to a suitable electrical plug 62. Similarly, in the case of electromagnets the coil terminals associated with each electromagnet may also be brought into this housing 58 and to the plug 62.

The permanent magnet of FIG. 4 when in the environment of the retrieval module of FIG. 1 may be considered energized when the axis of its magnetic poles are substantially perpendicular to the edge of the cards beoing held by the keeper bars 10. In this manner, when the rotary solenoid 54 is not energized, the greatest strength of the magnetic attractive field produced by the permanent magnet is in a direction parallel to the long dimension of the magnetic strip 32 of the card thereby effecting a less attractive force on the magnetic strip then would be exerted when the solenoid is energized.

Figure 5:
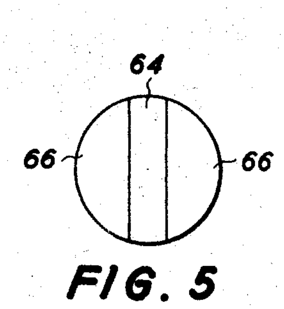
FIG. 5 illustrates in cross section an alternative permanent magnet which may be used in the retrieval module of FIG. 1.

Generally, therefore, both the electromagnet 42 of FIG. 3 and the permanent magnets of FIGS. 4 and 5 will have only one magnetic pole capable to contact the magnetic strip 32 associated with an information bearing member when the particular magnetic member 4 is energized. In the case of the electromagnet 42, segment 48 is divisible into north and south magnetic poles so that the contacting magnetic strip 32 will contact either a north or south pole depending on the point of contact along the long dimension of segment 48. In the case of the permanent magnets, only a single magnetic pole will be available for direct contact with the magnetic strip 32 when these magnets are energized.

While FIG. 2 illustrates rectangular notches in the code areas of the card 28, it should be understood that other notch configurations may be employed. For example, using a cylindrical permanent magnet as shown in FIG. 4, the notches may be arcuate as long as the attractive force between the permanent magnet and the arcuate notch portion of the magnetic strip is insuffiicent to hold the weight of one card.

FIG. 5 illustrates an alternative permanent magnet to that illustrated in FIG. 4 and comprises a permanent magnet 64 having a substantially rectangular cross section which is sandwiched between two hemispherical portions 66 of a suitable non-magnetic material. Therefore, it is seen that a completely cylindrical permanent magnet is not required in accordance with the present invention and a bar magnet may be used. It should be noted, however, that if a permanent magnet is utilized in the retrieval module of FIG. 1, it preferably should be of a configuration so as to permit its rotation by 90 degrees without effecting the position of the cards closely adjacent thereto. For example, a square cross sectional permanent magnet when rotated would effectively displace all the cards being maintained by the keeper bars 10 in the retrieval module of FIG. 1. This is undesirable for the reason that the cards will be subjected to excessive wear and will be distorted. Of course, the magnetic member of FIG. 5 does not necessarily have to include the casing 66, however, this casing aids in preventing undesirable pivoting of the card in certain retrieval situations.

Figure 6:
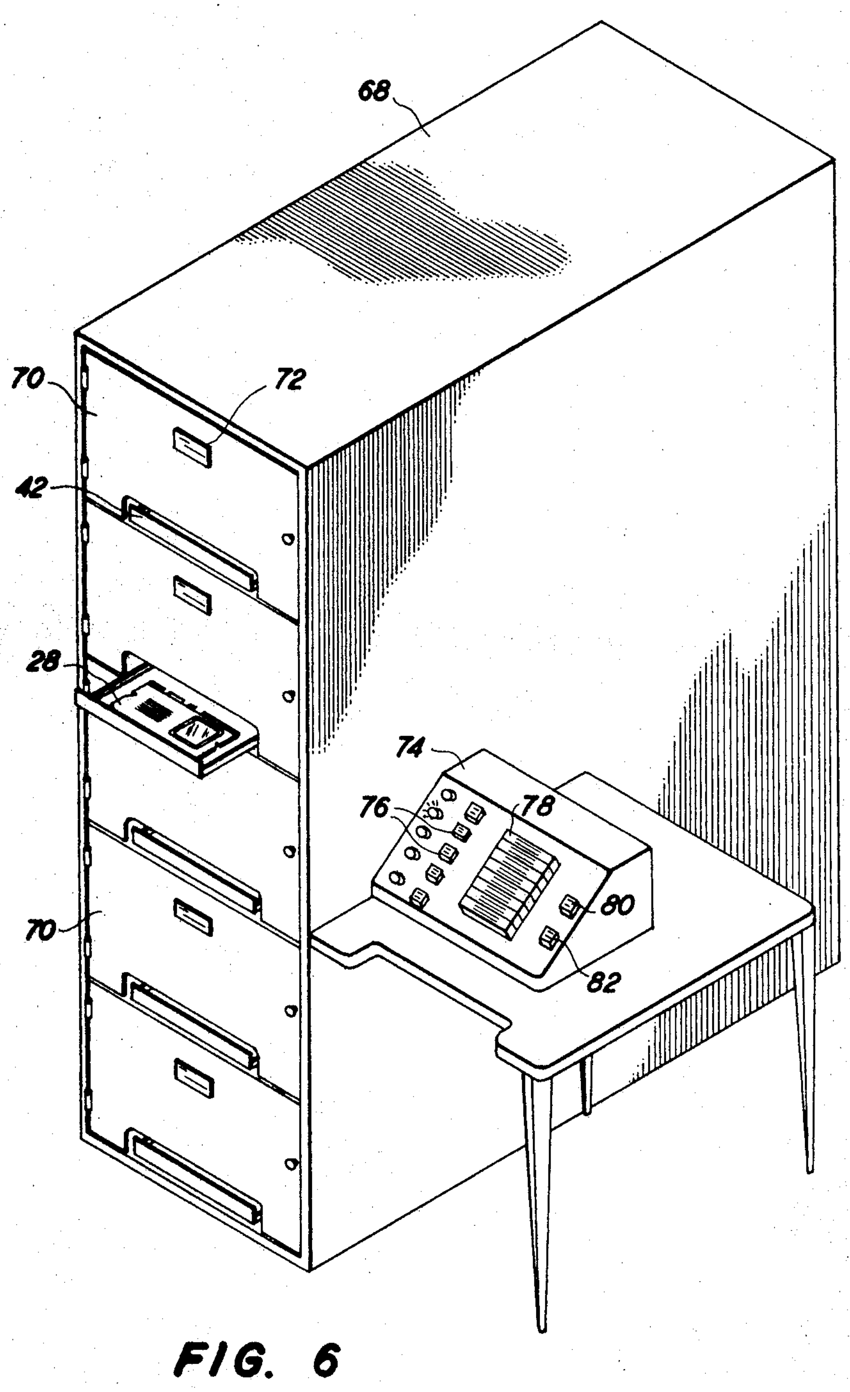
FIG. 6 illustrates a sample configuration of a retrieval system employing a plurality of retrieval modules as shown in FIG. 1; and, FIG. 7 illustrates schematically a control circuit which may be utilized in conjunction with the retrieval module of FIG. 1.

Reference to FIG. 6 shows a typical retrieval system utilizing a plurality of retrieval modules as shown in FIG. 1. An appropriate cabinet 68 is shown in FIG. 6 as a housing for five retrieval modules as shown in FIG. 1. Each module is eenclosed in the housing 68 by way of a hinged door 70 which may carry suitable indicia 72 indicating generically the contents of that particular retrieval module. The receiving tray 42 may be slidably positioned relative to the frame member 2 to permit its accessability to the operator during a retrieval operation. Associated with the retrieval modules is a control module generally designated by reference numeral 74 which is electrically connected to the terminals associated with each of the retrieval modules. For purposes of explanation, only, this control unit may comprise five buttons 76, which connect a set of seven code push bars 78 to control the magnetic members associated with one of the five retrieval modules selected by the depression of one of the push buttons 76. By pressing selected ones of the push bars 78 different magnetic members may be energized thereby selecting the desired coded card. A retrieve button 80 may also be provided along with a blower inhibit button 82 which may be used when returning a retrieved card to its respective retrieval module.

Figure 7:
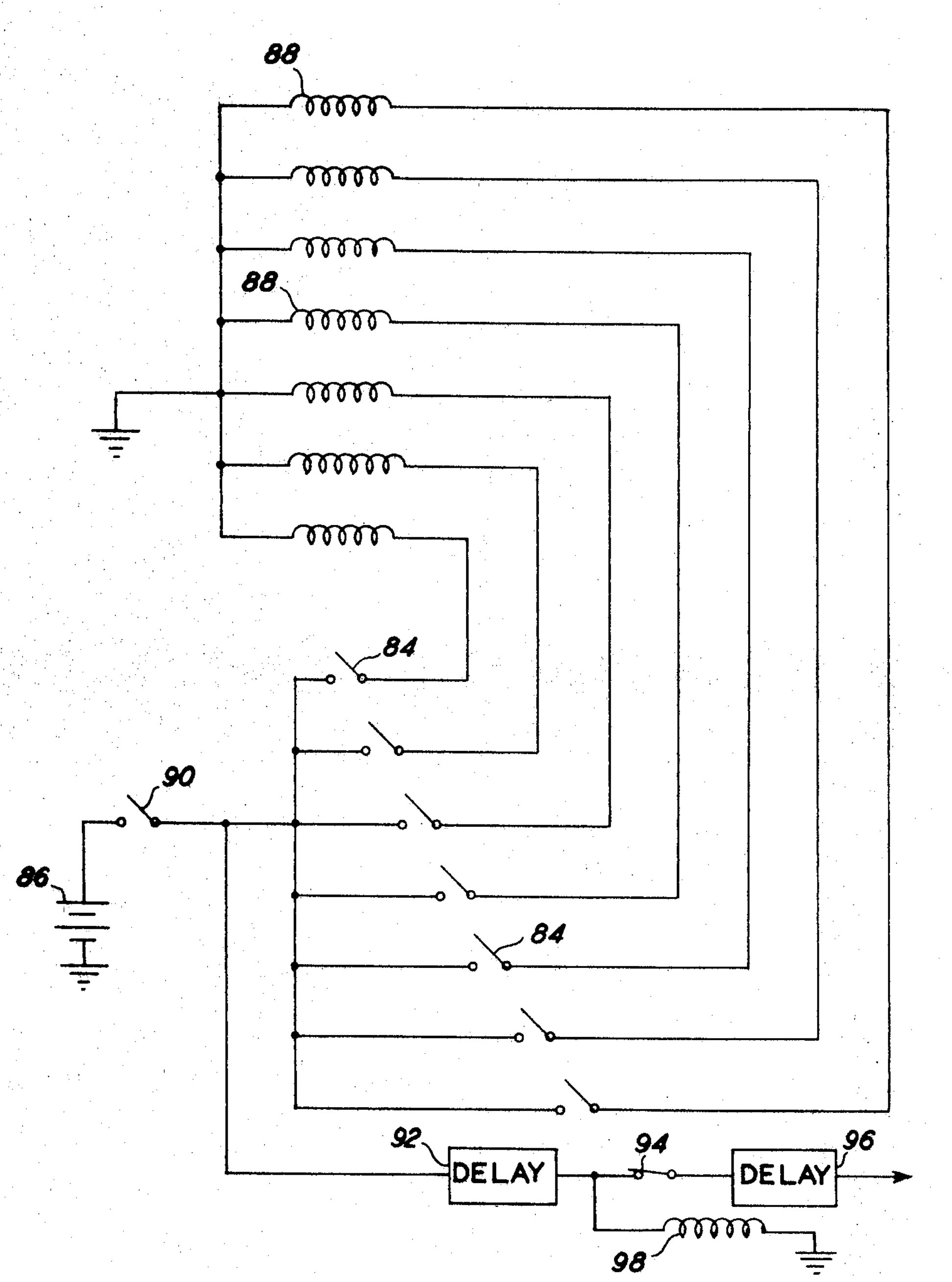

This may be better seen with reference to FIG. 7 which shows schematically a possible control circuit to be used with a retrieval module as illustrated in FIG. 1. Seven switches 84 each correspond individually to one of the seven push bars 78 in FIG. 6 and connect a source of suitable DC potential 86, for example, to associated coils 88. These coils may either be energizing coils for an electromagnet or the coils associated with the rotary solenoid employed with a permanent magnet represents the magnetic member. This DC potential is applied via switches 84 when retrieve switch 90 is depressed. In addition, the depression of the retrieve switch 90 provides a signal via a delay circuit 92 and normally closed switch 94 which correspond to the blower inhibit button 82 previously mentioned. This signal is delayed again by a delay circuit 96 and then supplied to the blower unit 40 previously alluded to. After the first delay, the signal is also supplied to a coil 98 which represents a coil of the rotary solenoid 18 controlling the keeper bars 10.

The system hereinabove described may be operated as follows: The operator selects the code corresponding to the desired card to be retrieved and inserts this code by depressing appropriate push bars 78 thereby depressing respective switches 84. Once this is done, the retrieve switch is closed and the appropirate magnetic members are energized. The energization of these selected magnetic members provides a magnetic attractive force to those code areas of the card in the retrieval module which have not been coded, i.e. notched. After a brief delay afforded by delay circuit 92, the keeper bars 10 are moved away from each other allowing the magnetic attractive force of the energized magnetic members 4 to support the cards in the retrieval module. At this point, the desired card will be free of any attractive force substantial enough to retain the card with the remaining cards and will disassociate itself with the remaining cards in the retrieval module. To assist in this dissociation, a delay circuit 96 will provide a signal after energization of the keeper bars which will initiate the blower assembly 40 to ruffle the cards as hereinabove described. The selected card then proceeds to the receiving tray 42 where it is picked up by an operator if so desired.

Return of a retrieved card to its particular retrieval module may be implemented by depressing all seven push bars, by pressing the blower inhibit button, and then depressing the retrieval button. This results in the keeper bars being moved away from each other and all the cards being held by all the magnetic members. The retrieved card may then be randomly re-inserted into the suspended array of cards.

The retrieve button 80 and switch 90 may be of the time delay nature so as to return the retrieval system to its initial condition after the retrieval operation is completed.

The aforementioned cycle of operation may be repeated and, in the system of FIG. 6 may be directed at any one of the five retrieval modules.

In summary, therefore, a retrieval system has been described which is characterized by the accuracy, ease of operation, ad simplicity desired in the superior system. The noise level of operation is acceptably low and the storage capacity virtually unlimited. While a simple code scheme has been illustrated, this code was illustratory only. The retrieval module of FIG. 1 may be compatible with any one of many codes.

Similarly, the circuit of FIG. 7 represents only an example of a typical circuit which may be employed to control the retrieval module. Other circuits may be devised to function in the same general manner to achieve the same results.

Therefore, it should be obvious that many modifications and variations of the present invention are possible in light of the above teachings. It is to be understood that the invention may be practiced otherwise than as specifically described and still be within the scope of the appended claims.

What is claimed is:

1. Retrieval apparatus for providing random access to a plurality of information bearing members, said members having a plurality of *n* code areas along one edge thereof, each code area adapted to include a magnetic characteristic, said apparatus including:

(a) support means for supporting a plurality of information bearing members, each of said members having *n* code areas along one edge thereof, each code area adapted to include a magnetic characteristic;

(b) *n* magnetic means each selectively actuatable for generating a magnetic attractive field, each of said magnetic means positioned relative to said support means to cooperate, when actuated, with a magnetic characteristic in the same code area of every information bearing member supported by said support means, each of said magnetic means, when actuated, having a single magnetic pole in contact with individual ones of said supported information bearing members, (c) selector means coupled to said magnetic means for selectively actuating desired ones of said magnetic means; and, (d) release means coupled to said support means for selectively removing the supporting influence of said support means from the supported information bearing members.

2. A retrieval apparatus as defined in claim 1 wherein each of said magnetic means includes a permanent magnetic having a magnetic pole axis substantially perpendicular to the plane of said $n$ magnetic members when said magnetic means is actuated, said axis being substantially parallel to said plane when said magnetic means is unactuated.

3. A retrieval apparatus as defined in claim 1 wherein each of said magnetic means includes an electromagnet, the coils of which are supplied electric current when said magnetic means is energized.

References Cited

UNITED STATES PATENTS

| | | | |
|---|---|---|---|
| 2,213,184 | 9/1940 | Andrews ---------- | 340—174.1 |
| 3,199,674 | 8/1965 | Kalthoff et al. ----- | 209—111.8 |

BERNARD KONICK, Primary Examiner

W. F. WHITE, Assistant Examiner

U.S. Cl. X.R.

209—111.8; 235—61.12; 340—174.1